(12) United States Patent
Chou et al.

(10) Patent No.: US 11,729,647 B2
(45) Date of Patent: Aug. 15, 2023

(54) RAN CONDITION AND CELL COMPOSITE LOAD INDICATORS

(71) Applicant: Apple Inc., Cupertino, CA (US)

(72) Inventors: Joey Chou, Scottsdale, AZ (US); Yizhi Yao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 17/257,925

(22) PCT Filed: Aug. 7, 2019

(86) PCT No.: PCT/US2019/045514
§ 371 (c)(1),
(2) Date: Jan. 5, 2021

(87) PCT Pub. No.: WO2020/033552
PCT Pub. Date: Feb. 13, 2020

(65) Prior Publication Data
US 2021/0289376 A1    Sep. 16, 2021

Related U.S. Application Data

(60) Provisional application No. 62/716,443, filed on Aug. 9, 2018.

(51) Int. Cl.
*H04W 24/08*    (2009.01)
*H04W 88/18*    (2009.01)
(Continued)

(52) U.S. Cl.
CPC ........... *H04W 24/08* (2013.01); *H04W 24/04* (2013.01); *H04W 36/0079* (2018.08);
(Continued)

(58) Field of Classification Search
None
See application file for complete search history.

(56) References Cited

U.S. PATENT DOCUMENTS 10,194,338 B2 * 1/2019 Zhang ................... H04W 24/02
2008/0091815 A1 * 4/2008 Rao ....................... H04L 67/125
709/223
(Continued)

FOREIGN PATENT DOCUMENTS

CA    2938389 C  *  2/2021  ............. H04L 12/16
CN    103797846 A  *  5/2014  ........ H04W 36/0083
(Continued)

OTHER PUBLICATIONS

3GPP: Technical Specification Group Services and System Aspects; Telecommunication management; Management and orchestration of 5G netowrks; 5G End to end Key Performance Indicators (KPI), Release 15, 3GPP TS 28.554, V1.2.2, Aug. 2018, pp. 1-15.
(Continued)

*Primary Examiner* — Ajit Patel
(74) *Attorney, Agent, or Firm* — Kowert, Hood, Munyon, Rankin & Goetzel, P.C.

(57) ABSTRACT

An apparatus of a management service equipment includes processing circuitry. To configure the management service equipment for measuring a plurality of key performance indicators (KPIs) in a 5G network with a plurality of network functions (NFs), the processing circuitry is to retrieve using a data analytic function of the management service equipment, a plurality of performance measurements associated with a cell of a radio access network (RAN) within the 5G network. A KPI of the plurality of KPIs associated with the cell is generated using the data analytic function of the management service equipment, based on the plurality of performance measurements. The KPI is encoded for transmission to a service application executing on a user equipment (UE) active within the cell of the RAN or executing within a cloud architecture.

20 Claims, 7 Drawing Sheets

(51) Int. Cl.
*H04W 24/04* (2009.01)
*H04W 76/18* (2018.01)
*H04W 36/00* (2009.01)
*H04W 74/08* (2009.01)
*H04W 84/04* (2009.01)

(52) U.S. Cl.
CPC ........ *H04W 74/0833* (2013.01); *H04W 76/18* (2018.02); *H04W 84/042* (2013.01); *H04W 88/18* (2013.01)

(56) References Cited

U.S. PATENT DOCUMENTS

| | | | |
|---|---|---|---|
| 2013/0324076 A1* | 12/2013 | Harrang | H04W 28/0812 455/405 |
| 2013/0331103 A1 | 12/2013 | Yang et al. | |
| 2014/0073303 A1 | 3/2014 | Henderson et al. | |
| 2016/0286410 A1* | 9/2016 | O'Malley | H04W 24/02 |
| 2017/0012833 A1* | 1/2017 | Kumar | H04L 41/5019 |
| 2017/0272960 A1* | 9/2017 | Li | H04L 43/08 |
| 2018/0184344 A1 | 6/2018 | Periyasamy et al. | |

FOREIGN PATENT DOCUMENTS

| | | | | |
|---|---|---|---|---|
| EP | 3018860 A1 * | 5/2016 | ......... | H04L 41/0663 |
| EP | 3197198 A1 * | 7/2017 | ........... | H04L 43/026 |
| EP | 3322126 A1 * | 5/2018 | ......... | H04L 41/0886 |
| KR | 1020180035643 | 4/2018 | | |
| WO | WO-2014162722 A1 * | 10/2014 | ............ | H04W 16/18 |
| WO | WO-2015122818 A1 * | 8/2015 | ....... | H04L 29/06523 |
| WO | WO-2016119822 A1 * | 8/2016 | ............. | H04L 41/00 |
| WO | WO-2019214830 A1 * | 11/2019 | ............. | H04L 41/12 |

OTHER PUBLICATIONS

International Search Report and Written Opinion of International Application No. PCT/US2019/045514, dated Nov. 22, 2019, pp. 1-10.

* cited by examiner

RAN CONDITION AND CELL COMPOSITE LOAD INDICATORS

PRIORITY CLAIM

This application claims the benefit of priority to U.S. Provisional Patent Application Ser. No. 62/716,443, filed Aug. 9, 2018, and entitled "RAN CONDITION AND CELL COMPOSITE LOAD KPIS," which provisional patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for providing key performance indicators (KPIs), such as radio access network (RAN) condition and cell composite load indicators in 5G networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for providing KPIs, such as RAN condition and cell composite load indicators in 5G networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
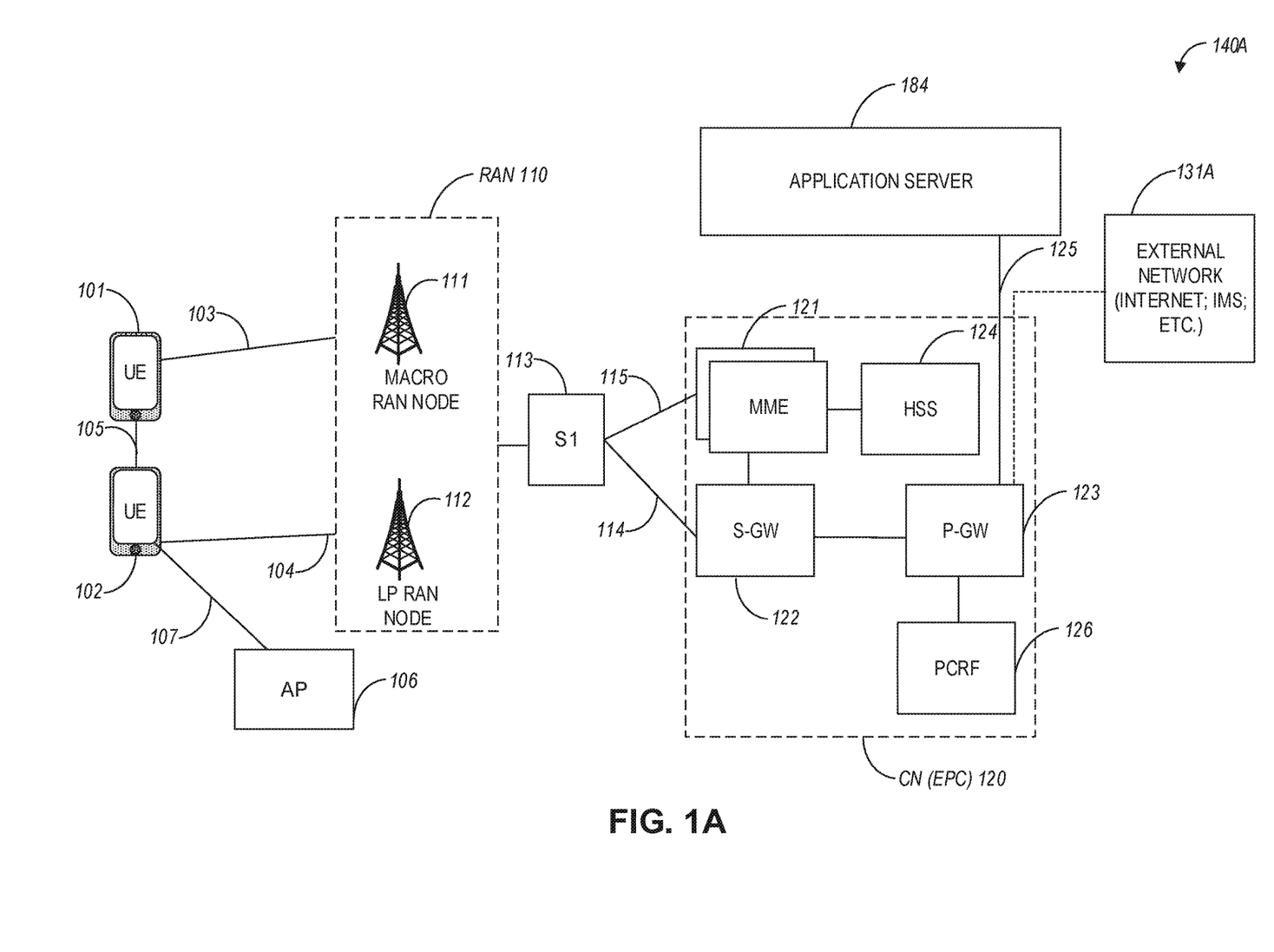
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1i). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network. One of the current enablers of IoT is the narrowband-IoT (NB-IoT).

A NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V 15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
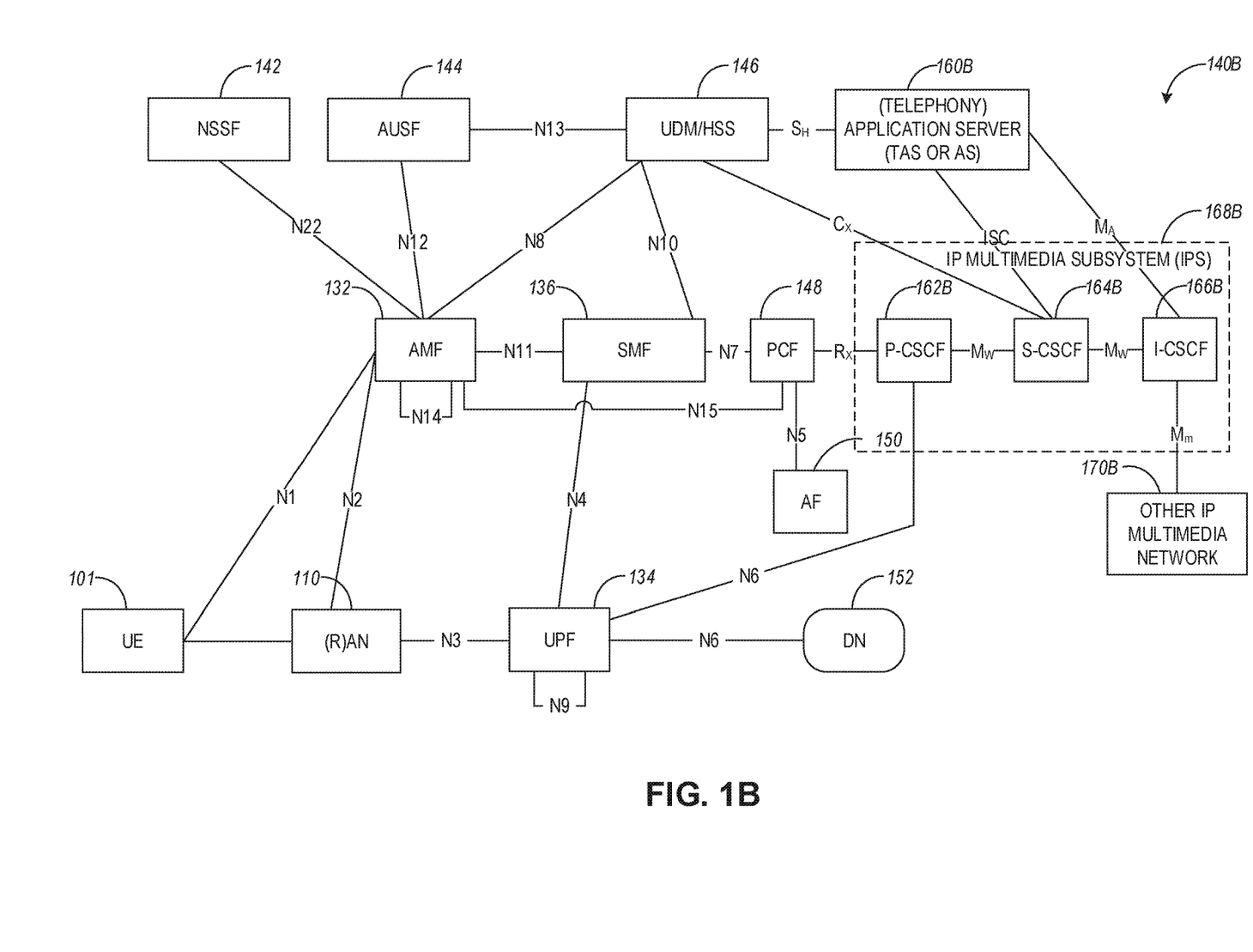
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to a network policy. The UPF 134 can be deployed in one or more configurations according to a desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
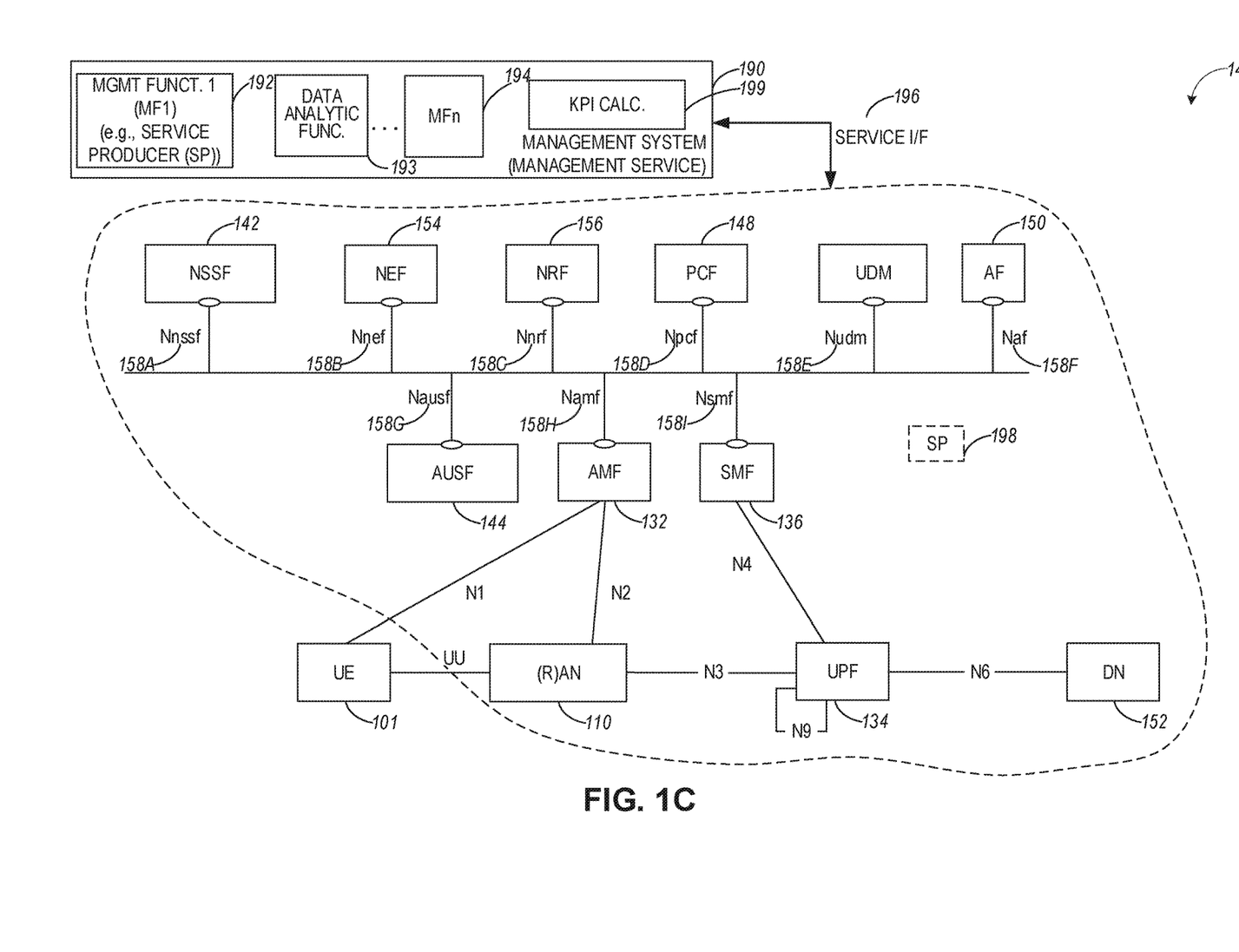

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Figure 2:
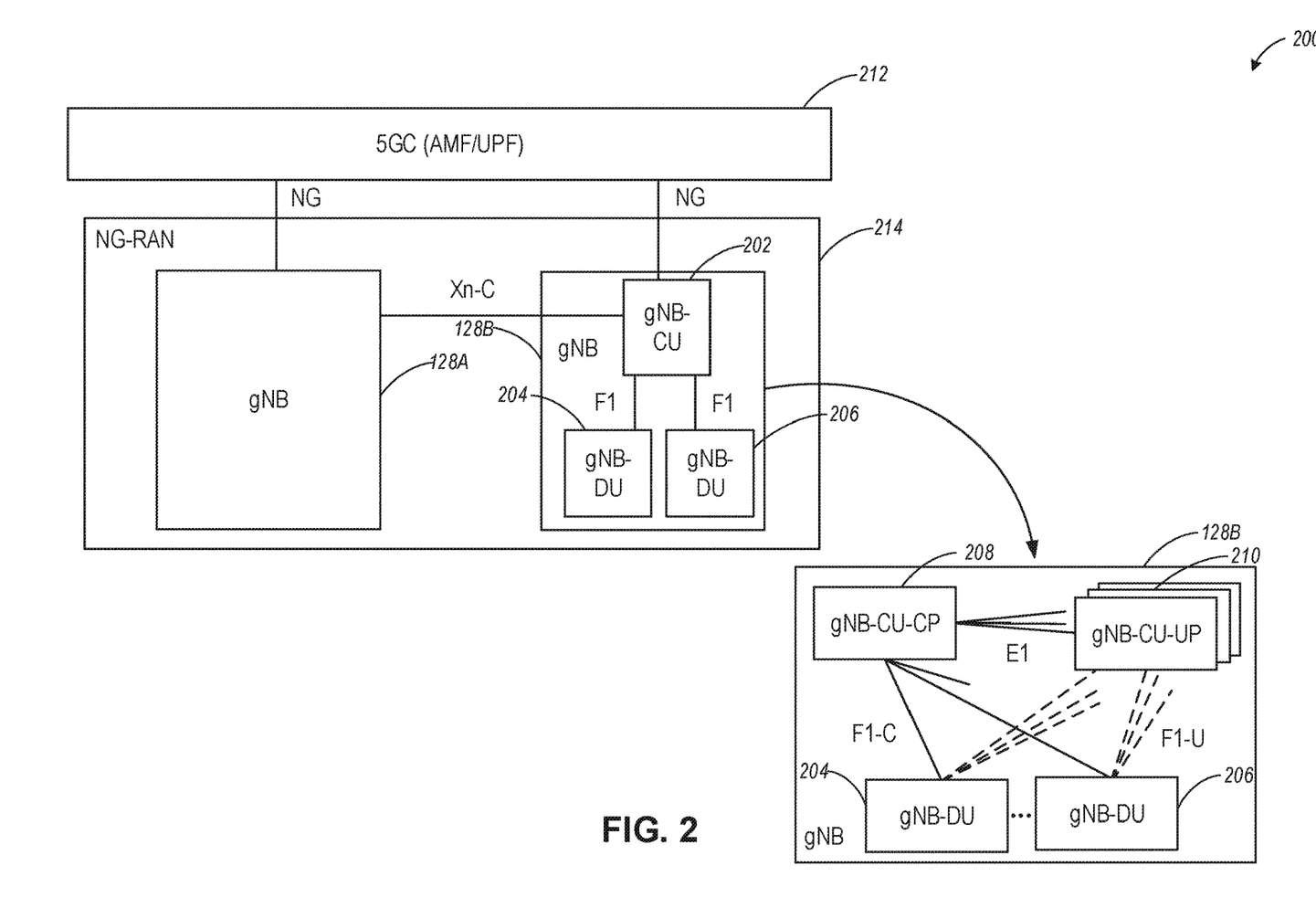
FIG. 2 illustrates components of an exemplary 5G-NR architecture with control unit control plane (CU-CP)—control unit user plane (CU-UP) separation, in accordance with some aspects.

FIG. 2 illustrates components of an exemplary 5G-NR architecture 200 with a control plane (CP)—user plane (UP) separation, in accordance with some aspects. Referring to FIG. 2, the 5G-NR architecture 200 can include a 5G core 212 and NG-RAN 214. The NG-RAN 214 can include one or more gNBs such as gNB 128A and 128B (which can be the same as gNB 128). The 5GC 212 and the NG-RAN 214, in some aspects, may be similar or the same as the 5GC 120 and the NG-RAN 110 of FIG. 1B, respectively. In some aspects, network elements of the NG-RAN 214 may be split into central and distributed units, and different central and distributed units, or components of the central and distributed units, may be configured for performing different protocol functions.

In some aspects, the gNB 128B can comprise or be split into one or more of a gNB Central Unit (gNB-CU) 202 and a gNB Distributed Unit (gNB-DU) 204, 206. Additionally, the gNB 128B can comprise or be split into one or more of a gNB-CU-Control Plane (gNB-CU-CP) 208 and a gNB-CU-User Plane (gNB-CU-UP) 210. The gNB-CU 202 is a logical node configured to host the radio resource control layer (RRC), service data adaptation protocol (SDAP) layer and packet data convergence protocol layer (PDCP) protocols of the gNB or RRC, and PDCP protocols of the E-UTRA-NR gNB (en-gNB) that controls the operation of one or more gNB-DUs. The gNB-DU (e.g., 204 or 206) is a logical node configured to host the radio link control layer (RLC), medium access control layer (MAC) and physical layer (PHY) layers of the gNB 128A, 128B or en-gNB, and its operation is at least partly controlled by gNB-CU 202. In some aspects, one gNB-DU (e.g., 204) can support one or multiple cells.

The gNB-CU 202 comprises a gNB-CU-Control Plane (gNB-CU-CP) entity 208 and a gNB-CU-User Plane entity 210. The gNB-CU-CP 208 is a logical node configured to host the RRC and the control plane part of the PDCP protocol of the gNB-CU 202 for an en-gNB or a gNB. The gNB-CU-UP 210 is a logical (or physical) node configured to host the user plane part of the PDCP protocol of the gNB-CU 202 for an en-gNB, and the user plane part of the PDCP protocol and the SDAP protocol of the gNB-CU 202 for a gNB.

The gNB-CU 202 and the gNB-DU 204, 206 can communicate via the F1 interface, and the gNB 128A can communicate with the gNB-CU 202 via the Xn-C interface. The gNB-CU-CP 208 and the gNB-CU-UP 210 can communicate via the E1 interface. Additionally, the gNB-CU-CP 208 and the gNB-DU 204, 206 can communicate via the F1-C interface, and the gNB-DU 204, 206 and the gNB-CU-UP 210 can communicate via the F1-U interface.

In some aspects, the gNB-CU 202 terminates the F1 interface connected with the gNB-DU 204, 206, and in other aspects, the gNB-DU 204, 206 terminates the F1 interface connected with the gNB-CU 202. In some aspects, the gNB-CU-CP 208 terminates the E1 interface connected with the gNB-CU-UP 210 and the F1-C interface connected with the gNB-DU 204, 206. In some aspects, the gNB-CU-UP 210 terminates the E1 interface connected with the gNB-CU-CP 208 and the F1-U interface connected with the gNB-DU 204, 206.

In some aspects, the F1 interface is a point-to-point interface between endpoints and supports the exchange of signaling information between endpoints and data transmission to the respective endpoints. The F1 interface can support control plane and user plane separation and separate the Radio Network Layer and the Transport Network Layer. In some aspects, the E1 interface is a point-to-point interface between a gNB-CU-CP and a gNB-CU-UP and supports the exchange of signaling information between endpoints. The E1 interface can separate the Radio Network Layer and the Transport Network Layer, and in some aspects, the E1 interface may be a control interface not used for user data forwarding.

In certain aspects, for EN-DC, the S1-U interface and an X2 interface (e.g., X2-C interface) for a gNB, consisting of a gNB-CU and gNB-DUs, can terminate in the gNB-CU.

In some aspects, gNB 128B supporting CP/UP separation, includes a single CU-CP entity 208, multiple CU-UP entities 210, and multiple DU entities 204, . . . , 206, with all entities being configured for network slice operation. As illustrated in FIG. 2, each DU entity 204, . . . , 206 can have a single connection with the CU-CP 208 via a F1-C interface. Each DU entity 204, . . . , 206 can be connected to multiple CU-UP entities 210 using F1-U interfaces. The CU-CP entity 208 can be connected to multiple CU-UP entities 210 via E1 interfaces. Each DU entity 204, . . . , 206 can be connected to one or more UEs, and the CU-UP entities 210 can be connected to a user plane function (UPF) and the 5G core 212.

In some aspects, applications for 5G networks can be configured to support autonomous driving that may need ultra-low latency and high reliability communications, as issues in the RAN (e.g., such as high latency communications) can have the possibility to cause property damage and body injury. When the auto navigation application (e.g., a navigation service application being executed on a user equipment) first sets up the route for traveling to a desired destination, the auto navigation application may use information (such as KPIs) from the network to assist the vehicle operator in advance in avoiding travel into the areas that may experience (or are experiencing) RAN issues (e.g., as indicated or deduced from the KPIs communicated by the network, such as by a network management service).

In some aspects, 5G services (e.g., enhanced mobile broadband (eMBB), ultra reliable low latency communications (URLLC), or massive machine-type communications (mMTC)) may be characterized by high-speed high data volume, low-speed ultra-low latency, and infrequent transmission of low data volume from a large number of emerging smart devices, respectively. To support the wide range of QoS levels, 5G networks may be automatically tuned (e.g., using one or more KPIs as discussed herein) in order to maintain the optimal performance. With the advances of artificial intelligence (AI) and big data, RAN condition and cell composite load KPIs can be collected, as discussed herein, and analyzed to determine the status and traffic patterns of 5G networks (e.g., one or more neighboring cells associated with a navigation route), based on time and locations (when and where) the KPIs were collected to enable analytic applications to predict potential issues, and to plan a solution in advance and resolve the issues (e.g., navigation-related issues) before happening. Techniques disclosed herein discuss the use of the RAN condition KPI and the cell composite load KPI (e.g., by analytic applications) to assist auto navigation (or other applications or services) as well as 5G network optimization.

In some aspects, existing 3GPP technical specifications (TSs) (e.g., TS 28.552) may be supplemented to define E2E delay measurements and may also include clarifications on how the measurements are counted and which network functions (NFs) are involved to support the E2E measurements and determination of one or more KPIs based on such measurements.

Examples of 5G NFs are illustrated in FIG. 1F. Referring again to FIG. 1F, in some aspects, the 5G network 140F may include a management system (or management service) 190, which is configured to offer management capabilities within the 5G network 140F. These management capabilities may be accessed by management service consumers via a service interface (e.g., 196), which may be composed of individually specified management service components. In this regard, the management system 190 may be configured to communicate with each of the NFs as well as other network entities within the network 140F, except the UE 101 (e.g., including the network entities within the dashed area in FIG. 1F), via the service interface 196. In some aspects, the management system 190 may be configured based on 3GPP TS 28.533 (v 16.0.0).

In some aspects, the management system 190 may include management functions (MFs) 192, . . . , 194. In some aspects, at least one of the MFs (e.g., MF 192) may be configured as a service producer, performing one or more E2E performance measurement functions. In some aspects, at least another of the MFs (e.g., MF 193) can be configured as a data analytic function (DAF) 193. In some aspects, the service producer (e.g., 198) and the DAF 193 may be implemented within at least one of the NFs within the 5G network 140F.

In some aspects, the DAF 193 can be configured to receive performance measurements, alarm information, and/or configuration information and determine one or more data analytic KPIs associated with the 5G network 140F. Example KPIs which can be determined by the DAF 193 include a RAN condition KPI and a cell composite load KPI, which can include an uplink cell composite load KPI in a downlink cell composite load KPI.

In some aspects, the following measurement definition template (described in greater detail in 3GPP TS 32.404 V15.0.0) may be used in connection with data analytic KPI determination by the DAF 193:

Measurement Name (a) Description. (b) Collection Method—contains the form in which the measurement data is obtained, including: CC (Cumulative Counter); GAUGE (dynamic variable), used when data being measured can vary up or down during the period of measurement; DER (Discrete Event Registration), when data related to a particular event are captured every nth event is registered, where n can be 1 or larger; SI (Status Inspection); TF (Transparent Forwarding); and OM (Object Mapping).

(c) Condition—contains the condition which causes the measurement result data to be updated. (d) Measurement Result (measured value(s), Units). This subclause contains a description of expected result value(s) (e.g., a single integer value). If a measurement is related to "external" technologies, this subclause shall also give a brief reference to other standard bodies. (e) Measurement Type. This subclause contains a short form of the measurement name specified in the header, which is used to identify the measurement type in the result files.

(f) Measurement Object Class. This subclause describes the measured object class (e.g. UtranCell, RncFunction, SgsnFunction). (g) Switching Technology. This subclause contains the Switching domain(s) this measurement is applicable to i.e. Circuit Switched and/or Packet Switched. (h) Generation. The generation determines if it concerns a GSM, UMTS, EPS, 5GS, combined (GSM+UMTS+EPS+5GS) or IMS measurement. (i) Purpose. This optional clause aims at describing who will be using the measurement.

Figure 3:
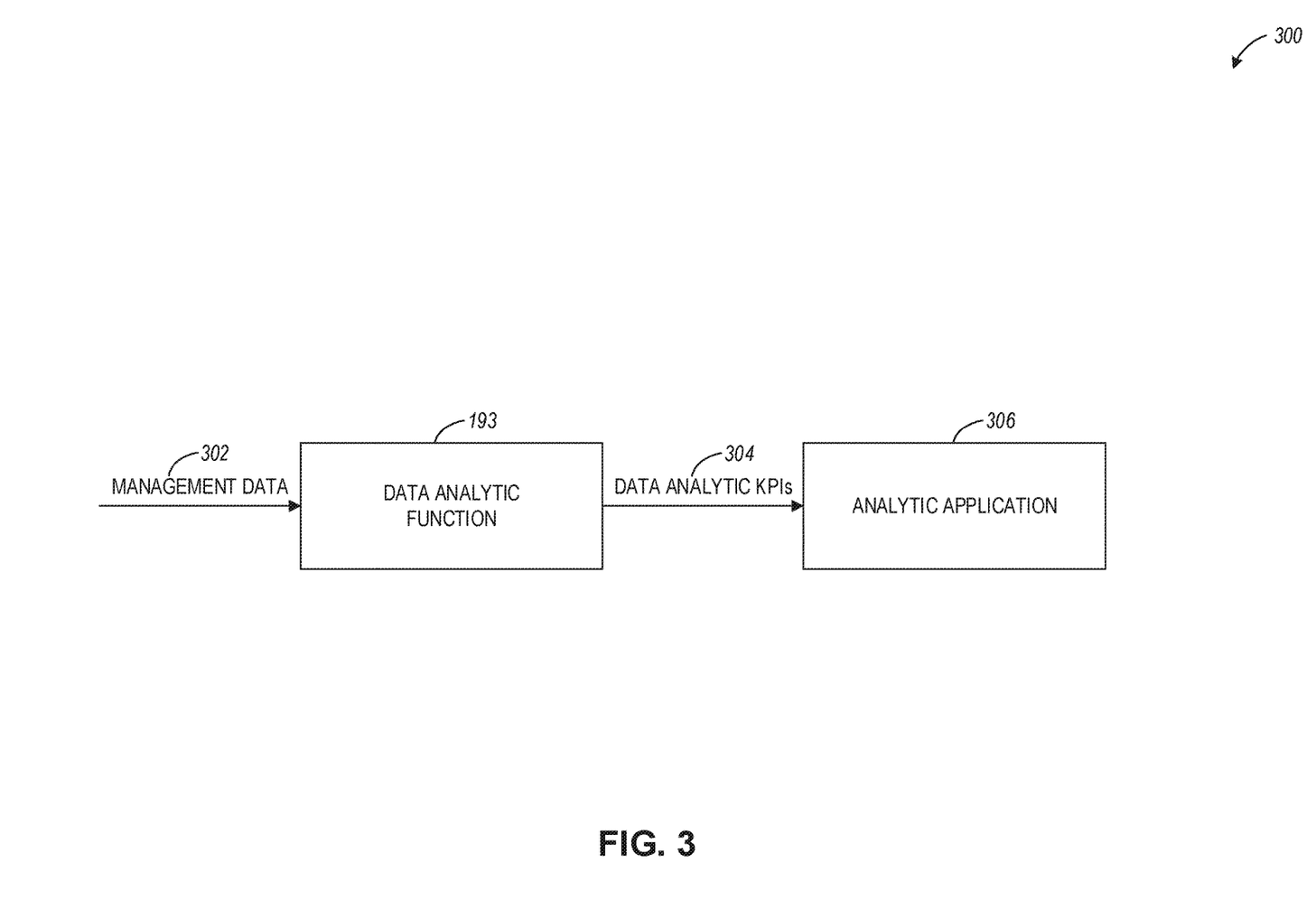
FIG. 3 illustrates generation of data analytic KPIs by a data analytic function within a management system of a 5G network, in accordance with some aspects.

FIG. 3 illustrates generation of data analytic KPIs by a data analytic function within a management system of a 5G network, in accordance with some aspects. Referring to FIG. 3, diagram 300 illustrates generation of data analytic KPIs 304. More specifically, the data analytic function 193 within the management system 190 receives management and data 302, which can be used to perform KPI calculations 199 in order to generate data analytic KPIs 304. The data analytic KPIs 304 can include RAN condition KPI and cell composite load KPI, as well as other KPIs indicative of network conditions and status of one or more entities within the 5G network 140F. In some aspects, the management data 302 can include performance measurements (e.g., a number of handover failures, a number of RRC connection setup failures, a number of RACH failures, packet loss rate, and so forth), alarm information (e.g., an alarm or notification generated in connection with a cell overload, network traffic throughput decrease below threshold, a number of network failures reaching a threshold, or other system or configuration alarms), as well as configuration information related to condition of one or more NR cells within the 5G network. In some aspects, the management data 302 can be generated by one or more of the NFs associated with the 5G network 140F and communicated to the data analytic function 193 or made available (e.g., stored in network storage) for retrieval by the data analytic function 193.

In some aspects, the data analytic KPIs 304 are communicated to an analytic application 306, which can be a management function within the management system 190, a network function within the 5G network 140F, or a standalone application such as a service application executing on a network device in the edge cloud or a public cloud. In some aspects, the data analytic function 193 can generate a RAN condition KPI, which can be described using the following subsections a)-j) of the above mentioned template:

RAN condition KPI.

a) This KPI indicates the condition of an NR cell that can be used to assist the applications, such as auto navigation. b) This KPI describes the condition of an NR cell. c) This KPI is generated from the analysis of performance measurements and alarms related to the condition of an NR cell. In some aspects, the value of the KPI is an integer number to represent the RAN condition of a cell and may include the following values: 0: indicating a healthy/normal functioning cell; 1: out of service cell; 2: capacity constraint (e.g., an overloaded cell); and 3: capability constraint (e.g., the cell does not support latency requirement). In some aspects, the above-listed integer values may be extended to represent additional conditions. d) RanCondition. e) The specific performance measurements used for deriving this KPI are up to implementation. f) 5GS. g) Condition. h) Integer. i) N/A. j) This KPI can be used to assist an application to perform auto navigation in autonomous driving aspects, as discussed in connection with FIG. 4.

Figure 4:
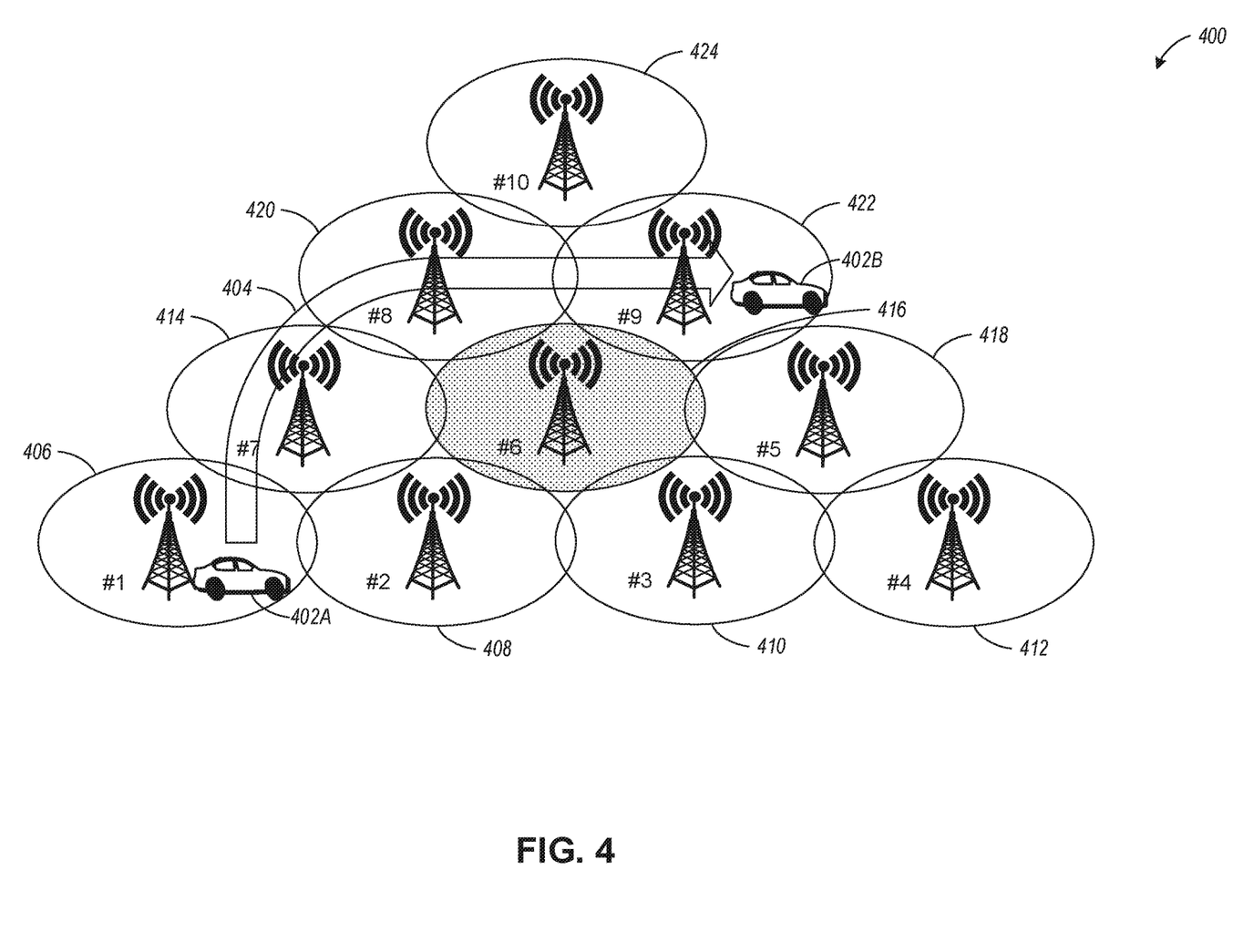
FIG. 4 illustrates a use case for a RAN condition KPI use in connection with outer navigation assistance, in accordance with some aspects.

FIG. 4 illustrates a use case 400 for a RAN condition KPI use in connection with outer navigation assistance, in accordance with some aspects. A major application for 5G networks is to support autonomous driving that may use ultra-low latency and high reliability, as issues in the RAN can have the possibility to cause property damage and body injury. When an auto navigation application first sets up a navigation route for a car to reach a destination, it can be configured to avoid directing the car from traveling into the areas that may experience RAN issues in advance. For example, if a cell is overloaded with user traffic, experiencing an outage, or not able to support the latency requirement, then this cell may be removed from the planned navigation route.

In some aspects and in connection with autonomous driving, a RAN condition KPI per cell (e.g., for each of the cells 406-424) may be collected, and made available to assist an autonomous driving vehicle at position 402A to reach a destination 402B, and in controlling the auto navigation from position 402A to position 402B. Based on a cell identifier received with the RAN condition KPI, the application knows the neighbor relation between cells 406-424. Based on the cell where the car is located, the autonomous driving application (or a navigation application) knows the RAN condition of neighboring cells along a planned route, and may change the route accordingly, as the RAN conditions may change along the way when the car is traveling.

For example, FIG. 4 illustrates a vehicle traveling from position 402A in cell 406 to position 402B in cell 422. It may be detected (e.g., via a received RAN condition KPI) that cell 416 is either overloaded with user traffic, is experiencing an outage, or it is not able to support the latency requirement of the traveling vehicle. Therefore, the auto navigation application plans the navigation route to detour and pass through cells 414 and 420. In some aspects, the data analytic function 193 can generate a cell composite load KPI, which can include an uplink (UL) cell composite load KPI and/or a downlink (DL) cell composite load KPI, which KPIs can be described using the following subsections a)-j) of the above mentioned template:

UL cell composite load KPI.

a) This KPI is intended to be used to analyze the traffic trend of 5G networks. b) This KPI describes the ULcomposite load of a NR cell. c) This KPI is generated from the analysis of management data such as performance measurements, alerts, and configuration information (e.g. PRB usage, an average number of active UEs, IP/data throughput in the UL, resource usage, and so forth). d) ulCellCompositeLoad. e) The specific performance measurements used for deriving this KPI are up to implementation. f) 5GS. g) Condition. h) Integer. i) N/A. j) This KPI can be used to understand the status and traffic patterns of 5G networks.

DL cell composite load KPI.

a) This KPI is intended to be used to analyze the traffic trend of 5G networks. b) This KPI describes the DLcomposite load of a NR cell. c) This KPI is generated from the analysis of management data such as performance measurements, alerts, and configuration information (e.g., PRB usage, an average number of active UEs, IP/data throughput in the DL, resource usage, and so forth). d) diCellCompositeLoad. e) The specific performance measurements used for deriving this KPI are up to implementation. f) 5GS. g) Condition. h) Integer. i) N/A. j) This KPI can be used to understand the status and traffic patterns of 5G networks.

In some aspects, with the advances of AI and big data, cell composite load KPIs can be collected and analyzed to understand the status and traffic patterns of 5G networks, based on time and locations when and where the KPI is collected to enable analytic applications to predict the potential issues, and to plan a solution in advance to resolve the issues before happening.

A service producer supported by one or more processors is configured to obtain management data, analyze the management data, generate the management data analytical KPI(s), and/or report the management data analytical KPI (s). The management data includes performance measurements, alarm information, and/or configuration information. The management data analytical KPI is a RAN condition KPI that indicates the RAN condition for a cell. The RAN condition KPI is generated from the management data, including, but not limited to, performance measurements, alarms, and/or configuration data related to the condition of a cell. The RAN condition KPI includes, but is not limited to, the following values: 0: healthy cell; 1: out of service cell; 2: capacity constraint (e.g., overloaded cell); and 3: capability constraint (e.g., the cell does not support latency requirement). The uplink cell composite load KPI is generated from the management data (e.g., PRB usage, an average active UE, IP throughput in the uplink, resource usages, and so forth). The downlink cell composite load KPI is generated from management data (e.g., PRB usage, average number of active UEs, IP throughput in the downlink, resource usage, and so forth). The downlink cell composite load KPI and uplink cell composite load KPI can be used by analytic applications to predict the potential issues, and to plan a solution in advance to resolve the issues before happening.

An analytic application acting as the service consumer supported by one or more processors, is configured to receive an analytic KPI, analyze the analytic KPI, and perform an action to mitigate an issue handled by the application. The analytic application is aware of a neighbor relation between cells. Based on the cell where the car is located, the analytic application knows the RAN condition of the neighboring cells, and may change the route, based on the RAN condition determined based on a received KPI. The analytic application can be configured to avoid cells with RAN condition of out of service, capacity constraint (e.g., overloaded), or capability constraint (e.g., does not support latency requirement). The analytic application can be configured to analyze the uplink cell composite load KPI and downlink cell composite load KPI to understand the status and traffic patterns of 5G networks, based on time and locations when and where the KPI is collected. The analytic application can be configured to generate a prediction of potential issues, and plan a solution in advance to resolve the issues before happening (e.g., dynamically change a navigation route for a self-driving vehicle based on received KPIs associated with condition of one or more cells the planned navigation route is passing through).

Figure 5:
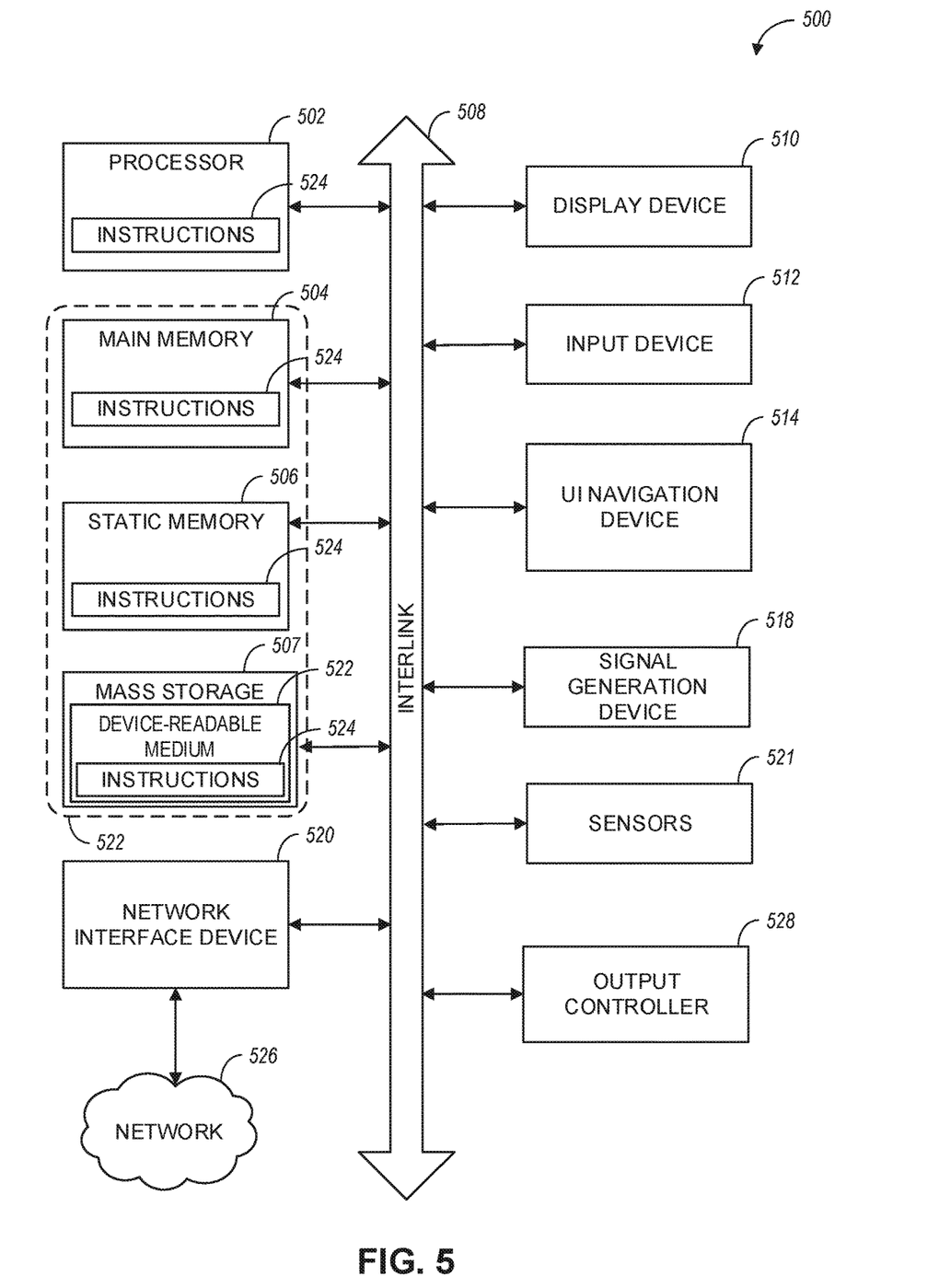
FIG. 5 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 5 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 500 may operate as a standalone device or may be connected (e.g., networked) to other communication devices.

Circuitry (e.g., processing circuitry) is a collection of circuits implemented intangible entities of the device 500 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 500 follow.

In some aspects, the device 500 may operate as a standalone device or may be connected (e.g., networked) to other devices. In a networked deployment, the communication device 500 may operate in the capacity of a server communication device, a client communication device, or both in server-client network environments. In an example, the communication device 500 may act as a peer communication device in peer-to-peer (P2P) (or other distributed) network environment. The communication device 500 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations. Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 500 may include a hardware processor 502 (e.g., a central processing unit (CPU), a graphics processing unit (GPU), a hardware processor core, or any combination thereof), a main memory 504, a static memory 506, and mass storage 507 (e.g., hard drive, tape drive, flash storage, or other block or storage devices), some or all of which may communicate with each other via an interlink (e.g., bus) 508.

The communication device 500 may further include a display device 510, an alphanumeric input device 512 (e.g., a keyboard), and a user interface (UI) navigation device 514 (e.g., a mouse). In an example, the display device 510, input device 512 and UI navigation device 514 may be a touch-screen display. The communication device 500 may additionally include a signal generation device 518 (e.g., a speaker), a network interface device 520, and one or more sensors 521, such as a global positioning system (GPS) sensor, compass, accelerometer, or another sensor. The communication device 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 507 may include a communication device-readable medium 522, on which is stored one or more sets of data structures or instructions 524 (e.g., software) embodying or utilized by any one or more of the techniques or functions described herein. In some aspects, registers of the processor 502, the main memory 504, the static memory 506, and/or the mass storage 507 may be, or include (completely or at least partially), the device-readable medium 522, on which is stored the one or more sets of data structures or instructions 524, embodying or utilized by any one or more of the techniques or functions described herein. In an example, one or any combination of the hardware processor 502, the main memory 504, the static memory 506, or the mass storage 516 may constitute the device-readable medium 522.

As used herein, the term "device-readable medium" is interchangeable with "computer-readable medium" or "machine-readable medium". While the communication device-readable medium 522 is illustrated as a single medium, the term "communication device-readable medium" may include a single medium or multiple media (e.g., a centralized or distributed database, and/or associated caches and servers) configured to store the one or more instructions 524. The term "communication device-readable medium" is inclusive of the terms "machine-readable medium" or "computer-readable medium", and may include any medium that is capable of storing, encoding, or carrying instructions (e.g., instructions 524) for execution by the communication device 500 and that cause the communication device 500 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 524 may further be transmitted or received over a communications network 526 using a transmission medium via the network interface device 520 utilizing any one of a number of transfer protocols. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input-multiple-output (SIMO), MIMO, or multiple-input-single-output (MISO) techniques. In some examples, the network interface device 520 may wirelessly communicate using Multiple User MIMO techniques.

The term "transmission medium" shall be taken to include any intangible medium that is capable of storing, encoding or carrying instructions for execution by the communication device 500, and includes digital or analog communications signals or another intangible medium to facilitate communication of such software. In this regard, a transmission medium in the context of this disclosure is a device-readable medium.

A communication device-readable medium may be provided by a storage device or other apparatus which is capable of hosting data in a non-transitory format. In an example, information stored or otherwise provided on a communication device-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the communication device-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus comprising:
one or more processors, wherein to configure a management service equipment for measuring a plurality of key performance indicators (KPIs) in a cellular network with a plurality of network functions (NFs), the one or more processors are configured to cause the management service equipment to:
  retrieve a plurality of performance measurements associated with a cell of a radio access network (RAN) within the cellular network;
  generate a KPI of the plurality of KPIs associated with the cell, based on the plurality of performance measurements, wherein the plurality of performance measurements are related to a number of handover failures experienced within the cell; and
  encode the KPI for transmission.

2. The apparatus of claim 1, wherein the one or more processors are configured to cause the management service equipment to:
  retrieve the plurality of performance measurements from at least one NF of the plurality of NFs.

3. The apparatus of claim 1, wherein the plurality of performance measurements comprise a number of radio resource control (RRC) connection setup failures experienced for a predetermined duration interval within the cell.

4. The apparatus of claim 1, wherein the plurality of performance measurements comprise a number of random access channel (RACH) procedure failures experienced for a predetermined duration interval within the cell.

5. The apparatus of claim 1, wherein the one or more processors are configured to cause the management service equipment to:
  retrieve alarm information or configuration information associated with communication conditions for the cell; and
  generate the KPI of the plurality of KPIs associated with the cell, further based on the alarm information or the configuration information.

6. The apparatus of claim 5, wherein the alarm information is a cell overload alarm indicating the cell is associated with more than a threshold number of active user equipment (UE) devices.

7. The apparatus of claim 1, wherein the RAN condition KPI is an integer indicating at least one of the following communication conditions of the cell: a normal (healthy) cell, an out-of-service cell, a capacity constraint indicating an overloaded cell, and a capability constraint indicating the cell does not support latency requirements.

8. The apparatus of claim 1, further comprising transceiver circuitry coupled to the one or more processors and one or more antennas coupled to the transceiver circuitry, and wherein the one or more processors are configured to cause the management service equipment to:
  decode navigation information received from an autonomous driving navigation application, the navigation information indicating a planned navigation route through the cell and at least one neighboring cell;
  determine the KPI in response to the received navigation information; and
  encode the KPI for transmission to the autonomous driving-navigation application, the autonomous driving-navigation application configured to modify the planned navigation route based on the KPI.

9. A non-transitory memory medium for operating a network node configured for generating a plurality of key performance indicators (KPIs) in a cellular network with a plurality of network functions (NFs), wherein the memory medium stores program instructions executable by one or more processors of the network node to:
  retrieve a plurality of performance measurements associated with a cell of a radio access network (RAN) within the cellular network;
  generate a KPI of the plurality of KPIs associated with the cell, based on the plurality of performance measurements, wherein the plurality of performance measurements are related to a number of handover failures experienced within the cell; and
  encode the KPI for transmission.

10. The non-transitory memory medium of claim 9, wherein the plurality of performance measurements comprise a number of radio resource control (RRC) connection setup failures experienced for a predetermined duration interval within the cell.

11. The non-transitory memory medium of claim 9, wherein the plurality of performance measurements comprise a number of random access channel (RACH) procedure failures experienced for a predetermined duration interval within the cell.

12. The non-transitory memory medium of claim 9, wherein the RAN condition KPI is an integer indicating at least one of the following communication conditions of the cell: a normal (healthy) cell, an out-of-service cell, a capacity constraint indicating an overloaded cell, and a capability constraint indicating the cell does not support latency requirements.

13. The non-transitory memory medium of claim 9, wherein the program instructions are further executable to:
  decode navigation information received from an autonomous driving navigation application, the navigation information indicating a planned navigation route through the cell and at least one neighboring cell;
  determine the KPI in response to the received navigation information; and
  encode the KPI for transmission to the autonomous driving-navigation application, the autonomous driving-navigation application configured to modify the planned navigation route based on the KPI.

14. A method for operating a network node configured for generating a plurality of key performance indicators (KPIs) in a cellular network with a plurality of network functions (NFs), comprising:
by the network node:
  retrieving a plurality of performance measurements associated with a cell of a radio access network (RAN) within the cellular network;
  generating a KPI of the plurality of KPIs associated with the cell, based on the plurality of performance measurements, wherein the plurality of performance measurements are related to a number of handover failures experienced within the cell; and
  encoding the KPI for transmission.

15. The method of claim 14, wherein the plurality of performance measurements comprise a number of radio resource control (RRC) connection setup failures experienced for a predetermined duration interval within the cell.

16. The method of claim 14, wherein the plurality of performance measurements comprise a number of random access channel (RACH) procedure failures experienced for a predetermined duration interval within the cell.

17. The method of claim 14, further comprising:
  decoding navigation information received from an autonomous driving navigation application, the navigation information indicating a planned navigation route through the cell and at least one neighboring cell;
  determining the KPI in response to the received navigation information; and
  encoding the KPI for transmission to the autonomous driving-navigation application, the autonomous driving-navigation application configured to modify the planned navigation route based on the KPI.

18. The apparatus of claim 1, wherein the generated KPI is a RAN condition KPI associated with a condition of RAN latency of the cell.

19. The non-transitory memory medium of claim 9, wherein the generated KPI is a RAN condition KPI associated with a condition of RAN latency of the cell.

20. The method of claim 14, wherein the generated KPI is a RAN condition KPI associated with a condition of RAN latency of the cell.

\* \* \* \* \*